(12) United States Patent
Low (10) Patent No.: US 11,692,114 B2
(45) Date of Patent: Jul. 4, 2023

(54) REFRIGERANT COMPOSITION (71) Applicant: Mexichem Fluor S.A. de C.V., San Luis Potosi (MX)

(72) Inventor: Robert E. Low, Runcorn (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 0 days.

(21) Appl. No.: 17/268,205

(22) PCT Filed: Aug. 14, 2019

(86) PCT No.: PCT/GB2019/052289
§ 371 (c)(1),
(2) Date: Feb. 12, 2021

(87) PCT Pub. No.: WO2020/035689
PCT Pub. Date: Feb. 20, 2020

(65) Prior Publication Data
US 2021/0179908 A1  Jun. 17, 2021

(30) Foreign Application Priority Data
Aug. 14, 2018 (GB) ................................ 1813242

(51) Int. Cl.
*C09K 5/04* (2006.01)
*F25B 9/00* (2006.01)
*F25B 30/02* (2006.01)

(52) U.S. Cl.
CPC .............. *C09K 5/045* (2013.01); *F25B 9/006* (2013.01); *F25B 9/008* (2013.01); *F25B 30/02* (2013.01); *C09K 2205/106* (2013.01); *C09K 2205/126* (2013.01); *C09K 2205/128* (2013.01); *F25B 2400/12* (2013.01)

(58) Field of Classification Search
CPC .............. C09K 5/045; C09K 2205/126; C09K 2205/106; C09K 2205/128; C09K 2205/122; F25B 9/006; F25B 9/008; F25B 30/02; F25B 2400/12
USPC ................................. 252/67, 68; 62/467, 529
See application file for complete search history.

(56) References Cited

U.S. PATENT DOCUMENTS

| | | | |
|---|---|---|---|
| 7,238,299 | B2 | 7/2007 | Singh et al. |
| 10,144,855 | B2 | 12/2018 | Saito et al. |
| 2005/0044885 | A1 | 3/2005 | Pearson |
| 2011/0162410 | A1 | 7/2011 | Low |
| 2015/0315446 | A1 | 11/2015 | Yana Motta et al. |
| 2016/0178246 | A1 | 6/2016 | Toyooka et al. |
| 2016/0187038 | A1* | 6/2016 | Toyooka ............ F28D 7/14 62/474 |
| 2016/0215193 | A1 | 7/2016 | Low |

FOREIGN PATENT DOCUMENTS

| | | |
|---|---|---|
| CN | 101914368 A | 12/2010 |
| CN | 105462564 A | 4/2016 |
| CN | 108070360 A | 5/2018 |
| CN | 108070361 A | 5/2018 |
| CN | 109666457 A | 4/2019 |
| EP | 0770113 A | 5/1997 |
| EP | 0770112 B1 | 4/1999 |
| EP | 3 725 861 A1 | 10/2020 |
| GB | 2480517 A | 11/2011 |
| GB | 2576328 A | 2/2020 |
| JP | H06220435 A | 8/1994 |
| JP | H0867870 A | 3/1996 |
| JP | 2006-504851 | 2/2006 |
| JP | 2009-062471 | 3/2009 |
| JP | 2011-116822 A | 6/2011 |
| JP | 2019-104814 | 6/2019 |
| WO | WG96/02606 A1 | 2/1996 |
| WO | WO 2004/041957 A1 | 5/2004 |
| WO | WO2017/151488 A1 | 9/2017 |
| WO | WO2019/074735 A1 | 4/2019 |
| WO | WO2019/102003 A1 | 5/2019 |
| WO | WO 2019/102008 A1 | 5/2019 |
| WO | WO2019/117213 A1 | 6/2019 |
| WO | WO 2019/234353 A1 | 12/2019 |
| WO | WO2020/035689 A1 | 2/2020 |
| WO | WO2020/165569 A1 | 8/2020 |

OTHER PUBLICATIONS

Adams et al., "Vapor-Liquid Equilibria Carbon Dioxide-Difluoromethane System", J. Chern. Eng. Data, vol. 16, No. 2, (1971) pp. 146-149, downloaded from the Internet on Aug. 19, 2021, 4 pages.
International Search Report and Written Opinion in Application No. PCT/GB2021/050347, dated Aug. 19, 2021, 15 pages.
International Search Report for corresponding International application No. PCT/GB2019/052289, dated Jan. 27, 2020.
Written Opinion for corresponding International application No. PCT/GB2019/052289, dated Jan. 27, 2020.
Office Action in Japanese Application No. 2021-507575 dated Mar. 13, 2023 (English Translation) (7 pages).

* cited by examiner

*Primary Examiner* — Douglas J Mc Ginty
(74) *Attorney, Agent, or Firm* — Crowell & Moring LLP (57) ABSTRACT

A refrigerant composition comprising carbon dioxide ($CO_2$; R-744) and from 1 to 32 weight % difluoromethane (R-32) based on the total weight of the composition is described. Also described is the use of the refrigerant composition for providing heating and cooling and a refrigeration, air-conditioning or heat pump system comprising the refrigerant composition.

32 Claims, 10 Drawing Sheets

Figure 1: simple transcritical cycle for modelling

Figure 2: Cooling COP of R-32/R-744 blends in air conditioning mode

Figure 3: Volumetric capacity of R-32/R-744 blends in air conditioning mode

Figure 4: Gas cooler pressure of R-32/R-744 blends in air conditioning mode

Figure 5: Evaporator temperature glide of R-32/R-744 blends in air conditioning mode Figure 6: Heating COP of R-32/R-744 blends in heat pump mode Figure 7: Volumetric Heating Capacity of R-32/R-744 blends in heat pump mode Figure 8: Gas cooler pressure of R-32/R-744 blends in heat pump mode Figure 9: Evaporator temperature glide of R-32/R-744 blends in heat pump mode Figure 10: two-stage transcritcal vapour compression cycle Figure 11: Cooling COP in two-stage cycle relative to R-744

Figure 12: Gas cooler pressure in two-stage cycle

Figure 13: Evaporator temperature glide in two-stage cycle

Figure 14: 1st stage compressor displacement in two-stage cycle

Figure 15: Fractionation paths of a ternary $CO_2$/R-32/R-134a (86%/7%/7%) at -40°C Figure 16: COP of $CO_2$/R-32/R-1132a blends Figure 17: Volumetric cooling capacity of $CO_2$/R-32/R-1132a blends

REFRIGERANT COMPOSITION

CROSS-REFERENCE TO RELATED APPLICATIONS

This application is the U.S. National Stage application of PCT application no. PCT/GB2019/052289, filed on Aug. 14, 2019, titled REFRIGERANT COMPOSITION, designating the United States, which claims priority to Great Britain application no. 1813242.3 filed on Aug. 14, 2018, the contents of which are each incorporated herein by reference in their entirety.

The present invention relates to a refrigerant composition and more particularly to a refrigerant composition comprising carbon dioxide ($CO_2$, R-744) that is useful in a transcritical refrigeration cycle. The present invention is particularly concerned with a refrigerant composition comprising carbon dioxide that is useful in automotive air-conditioning and heat pump systems that utilise a transcritical refrigeration cycle, especially systems for electric vehicles.

1,1,1,2-tetrafluoroethane (R-134a) was for some years the refrigerant of choice in automotive air conditioning systems following the phase out of dichlorodifluoromethane (R-12) which being a CFC has a high ozone depletion potential. The EU F-Gas Directive was then implemented which mandates a Global Warming Potential (GWP) limit of 150 for new car mobile air-conditioning (MAC) systems. As a result, the use of R-134a has now been largely superseded for new systems in Europe by the use of flammable 2,3,3,3-tetrafluoropropene (R-1234yf). R-1234yf is slightly less efficient than R-134a and new system designs now include extra equipment (an internal heat exchanger) to recover the loss in efficiency.

Mobile air-conditioning systems which utilise carbon dioxide in a transcritical vapour compression refrigeration cycle are known. Carbon dioxide has a Global Warming Potential of 1 and, as such, is an acceptable refrigerant according to the EU F-Gas Directive.

The basic transcritical cycle consists of the following steps:
1. evaporation of liquid refrigerant at low pressure, removing heat from a low temperature source fluid (such as air);
2. compression of the resultant refrigerant vapour in a compressor to yield a hot, high pressure gas;
3. cooling of the high-pressure gas by heat exchange with a sink fluid, at higher temperature than the source, to yield a cooler, dense refrigerant gas at high pressure. This gas is said to be a "supercritical" fluid because it is above its critical temperature; and
4. expansion of the supercritical fluid through an expansion valve or other restriction device to give a two-phase mixture of liquid refrigerant with vaporised refrigerant vapour at low pressure; this mixture then being fed back to the evaporator stage to complete the cycle.

In some systems which utilise carbon dioxide in a transcritical refrigeration cycle, the compression is carried out in two stages. This can improve cycle efficiency by cooling the gas between the two compression stages.

The performance and specifically the efficiency of a transcritical refrigeration cycle using carbon dioxide is typically lower than that of a conventional subcritical cycle using, for example, R-134a operating between the same source and sink temperatures.

It would be desirable to improve the efficiency of a transcritical refrigeration system using carbon dioxide.

DETAILED DESCRIPTION

We have found unexpectedly that the addition of difluoromethane (R-32) and optionally one or more additional fluorinated refrigerants to carbon dioxide can result in improvements to the efficiency of a transcritical refrigeration system, as well as reducing the operating pressure of such a system. The refrigerant can also meet the GWP limit of 150 set by the EU F-Gas Directive and be non-flammable.

Accordingly, in a first aspect the present invention provides a refrigerant composition comprising carbon dioxide ($CO_2$, R-744) and from 1 to 32 weight % difluoromethane (R-32) based on the total weight of the refrigerant composition.

Preferably, the refrigerant compositions of the present invention comprise from 1 to 25 weight % R-32 based on the total weight of the refrigerant composition, such as from about 2 to about 22%.

It has been found that adding R-32 to carbon dioxide can increase the energy efficiency of the fluid above that of pure carbon dioxide when used in transcritical vapour compression cycles that have been developed to use carbon dioxide as a refrigerant for a range of applications. The refrigerant composition of the invention will preferably have a Global Warming Potential of less than 150 and is preferably non-flammable.

In one embodiment, the difluoromethane is present in an amount of from 20 to 25 weight % based on the total weight of the refrigerant composition. This amount of R-32 offers a good balance of cycle properties while keeping temperature glide to an acceptable level. In another embodiment, the difluoromethane is present in an amount of less than 22 weight %, e.g. less than 21 weight %, based on the total weight of the refrigerant composition.

Specific compositions of the invention are binary refrigerant compositions comprising from 75 to 99 weight % carbon dioxide and from 25 to 1 weight % difluoromethane. Preferred binary refrigerant compositions comprise from 75 to 80 weight % carbon dioxide and from 25 to 20 weight % difluoromethane. One suitable binary refrigerant composition comprises 78 weight % carbon dioxide±1 weight % and 22 weight % difluoromethane±1 weight %. Another suitable binary refrigerant composition comprises 79 weight % carbon dioxide±1 weight % and 21 weight % difluoromethane±1 weight %. Binary refrigerant compositions comprising less than 22 weight % difluoromethane have a GWP below 150.

Binary compositions of R-32 and carbon dioxide having up to about 22% by weight can exhibit the following benefits: non-flammable as formulated; improved energy efficiency relative to carbon dioxide; reduced operating pressure relative to carbon dioxide; temperature glide in the evaporator of less than 10° C.; and Global Warming Potential below 150, which is a requirement for car air-conditioning in Europe and also for some stationary refrigeration/air-conditioning systems covered by the European F-Gas directive.

In one embodiment of the present invention, the compositions can additionally comprise 1,1-difluoroethylene (R-1132a).

In one embodiment, R-1132a is present in the compositions of the present invention in an amount of up to 20 or 22 weight %, such as from 2 to 15 weight %, preferably from 4 to 14 weight % based on the total weight of the refrigerant composition.

Conveniently, such compositions of the present invention comprise from 50 to 95 weight % of carbon dioxide, from 1 to 32 weight % difluoromethane and from 1 to 20 weight % of R-1132a, such as from 55 to 93 weight % of carbon dioxide, from 2 to 32 weight % difluoromethane and from 2 to 15 weight % of R-1132a, preferably from 64 to 93 weight % of carbon dioxide, from 2 to 25 weight % of difluoromethane and from 2 to 14 weight % of R-1132a, such as from 65 to 93 weight % of carbon dioxide, from 2 to 22 weight % of difluoromethane, for example from 2 to 14 weight % of R-1132a based on the total weight of the refrigerant composition The preferred compositions of the present invention additionally comprise 1,1,1,2-tetrafluoroethane (R-134a). The proportions of R-32 and R-134a in the composition are preferably selected to ensure that the overall composition will be considered non-flammable as formulated, and preferably non-flammable as per the ASHRAE Standard 34 protocol, and will have a Global Warming Potential (GWP) below 150. These preferred compositions are suitable for use in automotive air-conditioning and heat pump applications amongst other uses.

In another embodiment of the present invention, the proportions of R-32 and R-134a in the composition are selected to ensure that the overall composition is non-flammable as per the ASHRAE Standard 34 protocol and has a Global Warming Potential (GWP) below 300. These preferred compositions are believed to be suitable for use in stationary refrigeration applications.

Preferred ternary compositions comprise 86 weight % carbon dioxide±1 weight %, 7 weight % difluoromethane±1 weight % and 7 weight % 1,1,1,2-tetrafluroethane±1 weight %.

Another preferred refrigerant composition of the present invention is a quaternary composition comprising carbon dioxide, difluoromethane, R-1132a and 1,1,1,2-tetrafluoroethane.

The refrigerant composition of the invention can also include other refrigerant compounds in place of or in addition to the 1,1,1,2-tetrafluroethane (R-134a) that is used in the above described ternary composition to provide other ternary or higher refrigerant compositions. Suitable refrigerant compounds for inclusion in the refrigerant composition of the invention include 2,3,3,3-tetrafluoropropene (R-1234yf) and 1,3,3,3-tetrafluoropropene (R-1234ze(E)). If R-1234yf or R-1234ze(E) are used in the composition in addition to R-134a, the amounts of the compounds are preferably selected so that the binary mixture of either R-1234yf or R-1234ze(E)e with R-134a is non-flammable.

In one embodiment, the compositions of the present invention may consist essentially of the stated components. By the term "consist essentially of", we include the meaning that the compositions of the invention contain substantially no other components, particularly no further (hydro)(fluoro) compounds (e.g. (hydro)(fluoro)alkanes or (hydro)(fluoro)alkenes) known to be used in heat transfer compositions. The term "consist of" is included within the meaning of "consist essentially of".

By "substantially no" we include the meaning that the compositions of the invention contain 0.5% by weight or less of the stated component, preferably 0.1% by weight or less, based on the total weight of the refrigerant composition.

The compositions of the present invention are useful in mobile air-conditioning applications as well as mobile heat pump applications which use transcritical refrigeration cycles. The compositions may provide particular benefits where the air-conditioning and/or heat pump system is used in an electric vehicle, whether a purely electric or hybrid vehicle.

Accordingly, in a second aspect the present invention provides a transcritical air-conditioning and/or heat pump system which uses a refrigerant composition of the first aspect of the invention. The refrigerant composition can be as described in any of the embodiments discussed above.

Transcritical cycle technology is also used with carbon dioxide in the following applications: heat pump water heaters for production of domestic hot water; supermarket refrigeration at medium temperature and low temperature levels; residential air-conditioning; and refrigerated transport systems. In some of these applications the vapour compression cycle used is a single compression cycle as is typical in mobile air-conditioning applications. In other applications, the gas compression is carried out in two stages, which permits efficient operation over a large temperature difference between heat source and heat sink temperatures. Accordingly, the compositions are suitable for use in single and dual compression stage cycle.

The refrigerant compositions of the invention will typically be combined with a lubricant when used in a refrigeration, air-conditioning or heat pump system. Suitable lubricants include polyol esters, such as neopentyl polyol esters, and polyalkylene glycols, preferably end capped at both ends with an alkyl, e.g. a $C_{1-4}$ alkyl, group.

The present invention is now illustrated but not limited by the following examples.

Example 1

The performance of a transcritical air-conditioning cycle for mobile air-conditioning (MAC) applications was investigated using standard vapour compression cycle modelling techniques. Thermodynamic properties of the mixtures were calculated using the REFPROP9.1 property calculation software. The default REFPROP interaction parameters for mixtures of $CO_2$ with R-32 were used in all calculations. For mixtures containing R-134a, $CO_2$ and R32, the REFPROP interaction parameters were used for the R-32/R-134a pair and experimentally-derived interaction parameters were used for the $CO_2$/R-134a pair.

The cycle model was implemented in Microsoft Excel. The cycle calculation varied the evaporator pressure so that the calculated mean evaporation temperature met the target value.

Simultaneously the gas cooler pressure was varied to maximise the cycle Coefficient of Performance (COP).

Binary mixtures of $CO_2$ with R32 were simulated over a range of compositions at three different ambient air temperatures. The results are shown in Table 2 below and selected data are graphed in FIGS. 2 to 5.

TABLE 2

Binary compositions of R-32/$CO_2$ at various ambient air temperatures

| | | CO2 | 100% | 95% | 90% | 85% | 80% | 79% | 75% | 70% |
|---|---|---|---|---|---|---|---|---|---|---|
| | | R32 | 0% | 5% | 10% | 15% | 20% | 21% | 25% | 30% |
| Ambient air temperature = 33° C. | | | | | | | | | | |
| Coefficient of Performance | COP | | 2.69 | 2.77 | 2.86 | 2.97 | 3.09 | 3.12 | 3.19 | 3.27 |
| Volumetric cooling capacity | Q | | 14497 | 14029 | 13553 | 13078 | 12763 | 12763 | 12650 | 12401 |
| Compressor discharge temperature | Tdis (° C.) | | 102.6 | 103.7 | 104.4 | 104.5 | 105.3 | 105.8 | 107.7 | 109.8 |
| Evaporator pressure | Pev (bar) | | 41.8 | 39.1 | 36.6 | 34.3 | 32.0 | 31.6 | 30.0 | 28.0 |
| Gas cooler pressure | Pco (bar) | | 90.2 | 84.9 | 79.5 | 74.1 | 69.4 | 68.8 | 66.3 | 63.2 |
| Evaporator temperature glide | DTev (K) | | 0.0 | 1.4 | 2.8 | 4.2 | 5.5 | 5.7 | 6.7 | 7.8 |
| Ambient air temperature = 43° C. | | | | | | | | | | |
| Coefficient of Performance | COP | | 1.76 | 1.79 | 1.82 | 1.86 | 1.90 | 1.91 | 1.95 | 2.01 |
| Volumetric cooling capacity | Q | | 12923 | 12477 | 12026 | 11559 | 11176 | 11090 | 10746 | 10257 |
| Compressor discharge temperature | Tdis | | 129.1 | 131.4 | 133.3 | 135.1 | 136.8 | 137.0 | 137.4 | 136.8 |
| Evaporator pressure | Pev | | 41.8 | 39.1 | 36.5 | 34.1 | 31.8 | 31.4 | 29.7 | 27.7 |
| Gas cooler pressure | Pco | | 115.6 | 109.8 | 104.0 | 98.3 | 93.1 | 91.9 | 87.4 | 81.1 |
| Evaporator temperature glide | DTev | | 0.0 | 1.3 | 2.6 | 3.9 | 5.0 | 5.2 | 6.0 | 6.8 |
| Ambient air temperature = 58° C. | | | | | | | | | | |
| Coefficient of Performance | COP | | 1.10 | 1.12 | 1.13 | 1.15 | 1.17 | 1.18 | 1.19 | 1.21 |
| Volumetric cooling capacity | Q | | 11092 | 10697 | 10295 | 9941 | 9553 | 9476 | 9171 | 8796 |
| Compressor discharge temperature | Tdis | | 165.1 | 168.1 | 170.9 | 174.4 | 176.9 | 177.4 | 179.0 | 180.6 |
| Evaporator pressure | Pev | | 41.8 | 39.0 | 36.4 | 33.9 | 31.6 | 31.1 | 29.4 | 27.4 |
| Gas cooler pressure | Pco | | 159.4 | 152.2 | 145.3 | 139.5 | 133.1 | 131.8 | 126.7 | 120.2 |
| Evaporator temperature glide | DTev | | 0.0 | 1.2 | 2.4 | 3.5 | 4.5 | 4.7 | 5.4 | 6.1 |

Figure 1:
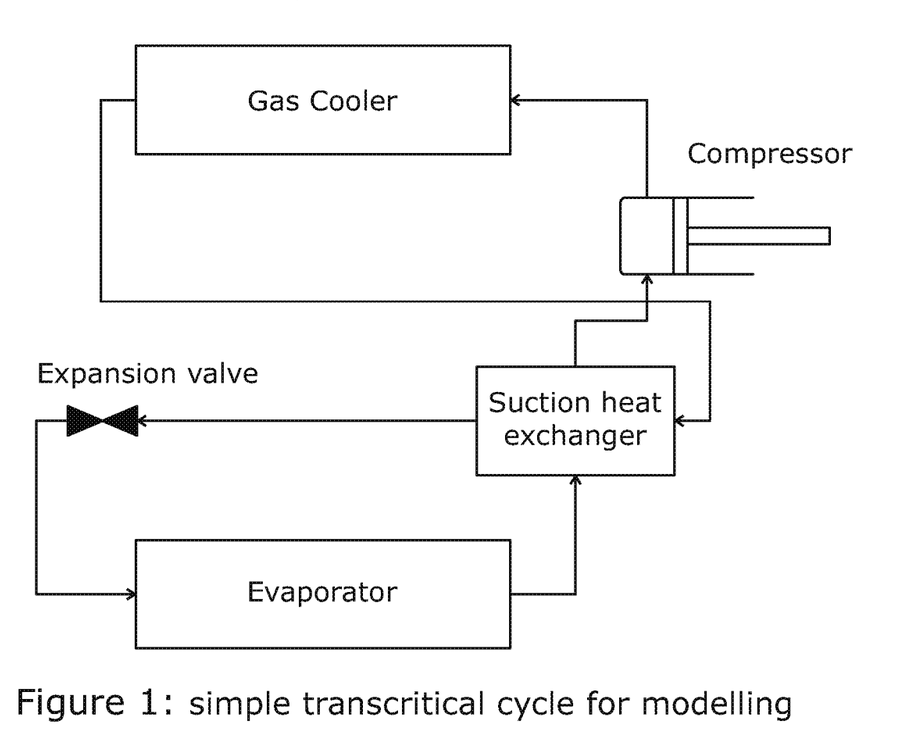
FIG. 1 illustrates an exemplary one-stage trans-critical cycle for modeling refrigerant compositions
Figure 2:
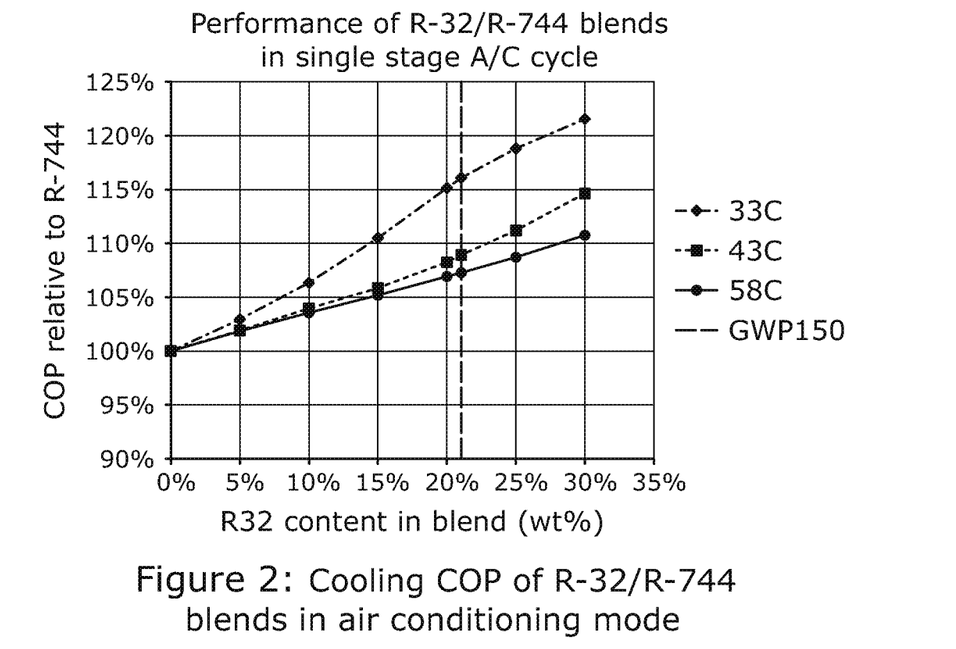
FIGS. 2-9 depict graphs illustrating the performance of R-32/R-744 blends in a one-stage A/C cycle.
Figure 3:
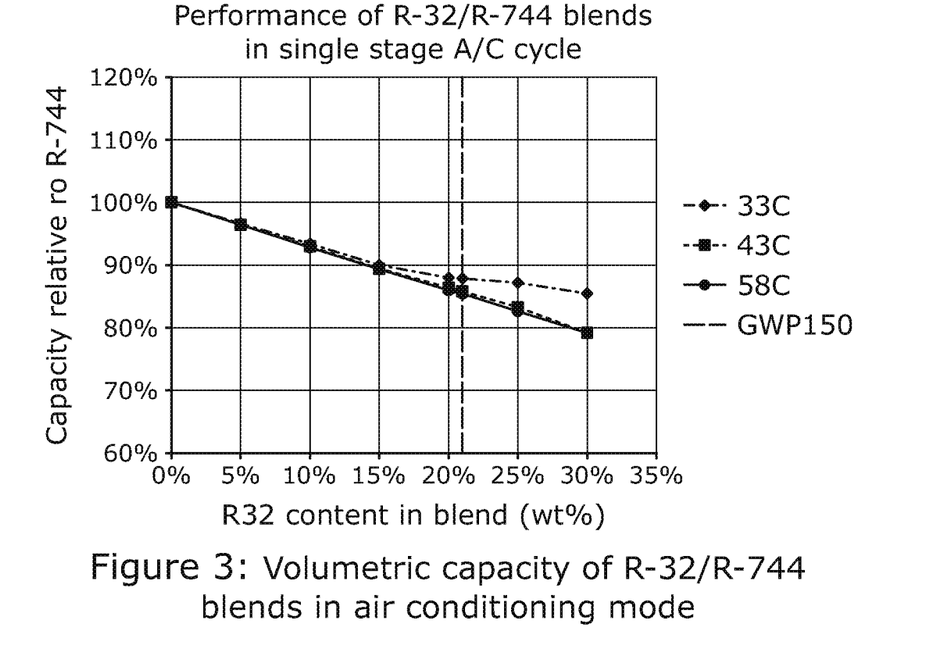
Figure 4:
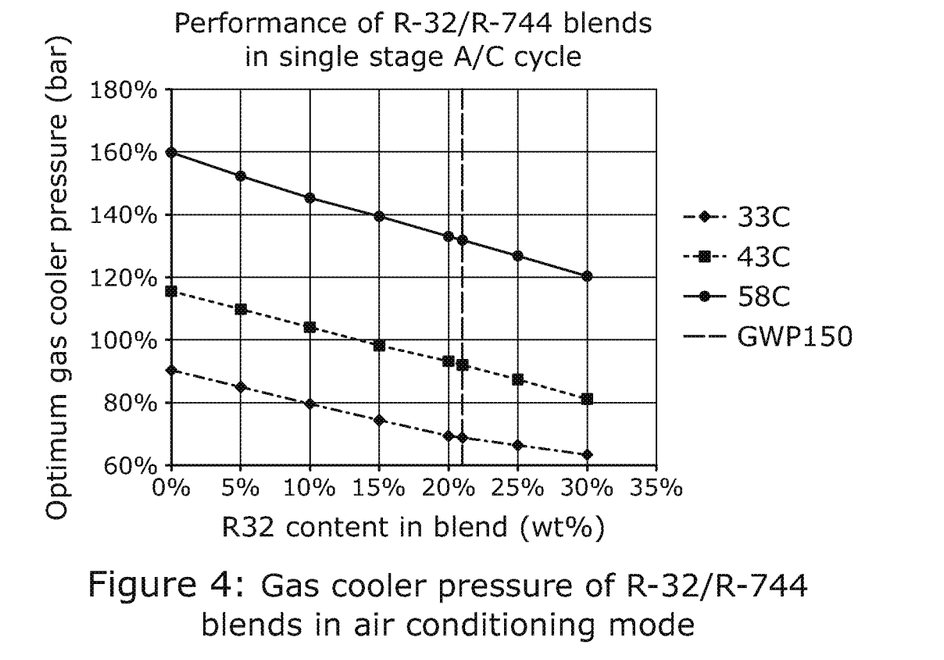
Figure 5:
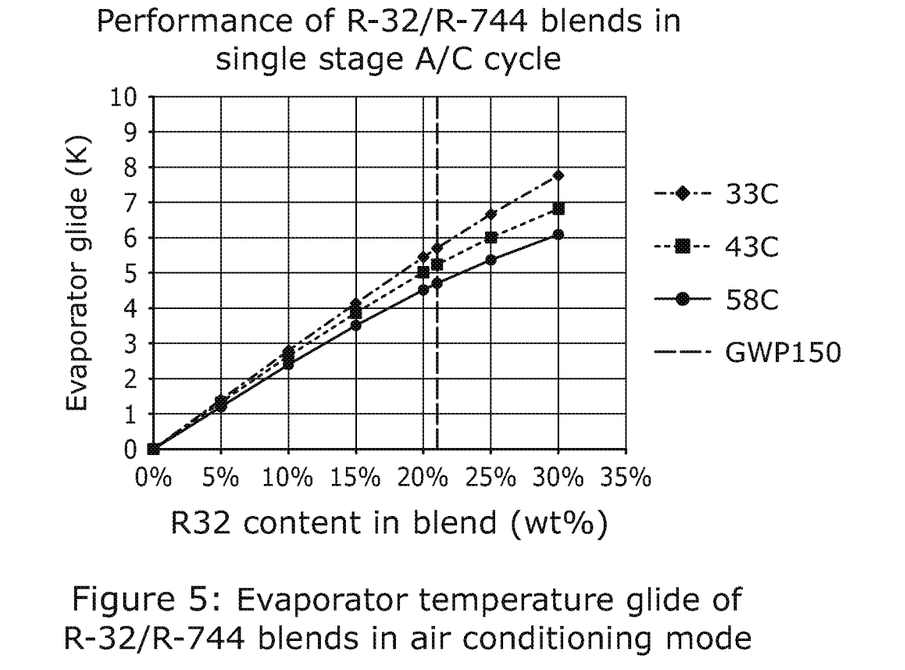
Figure 6:
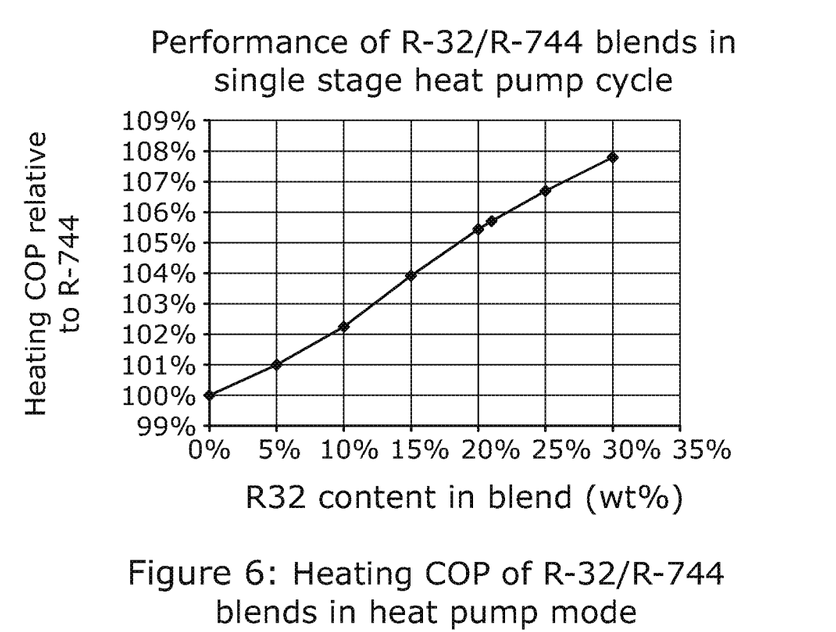
Figure 7:
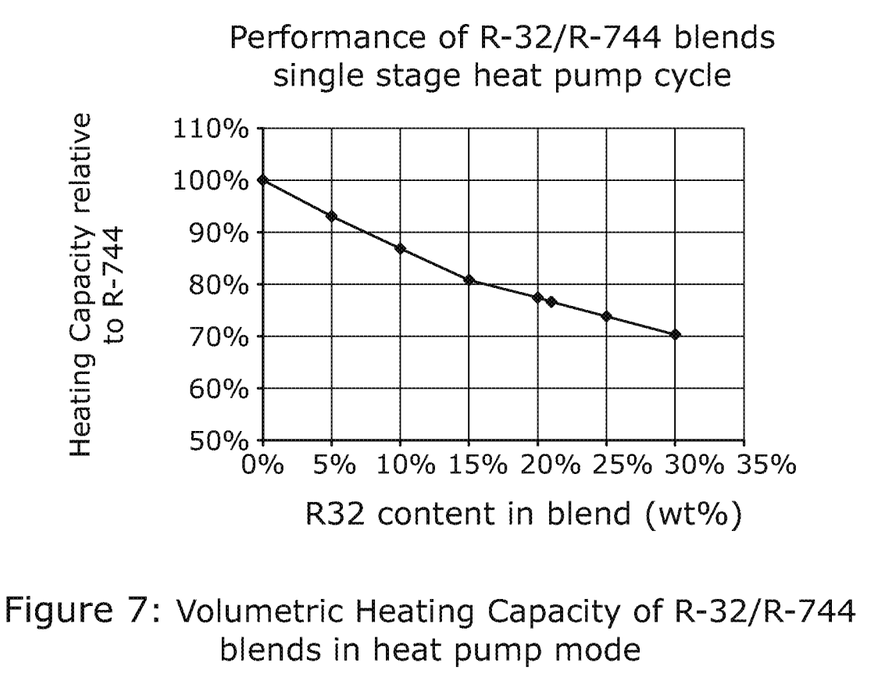
Figure 8:
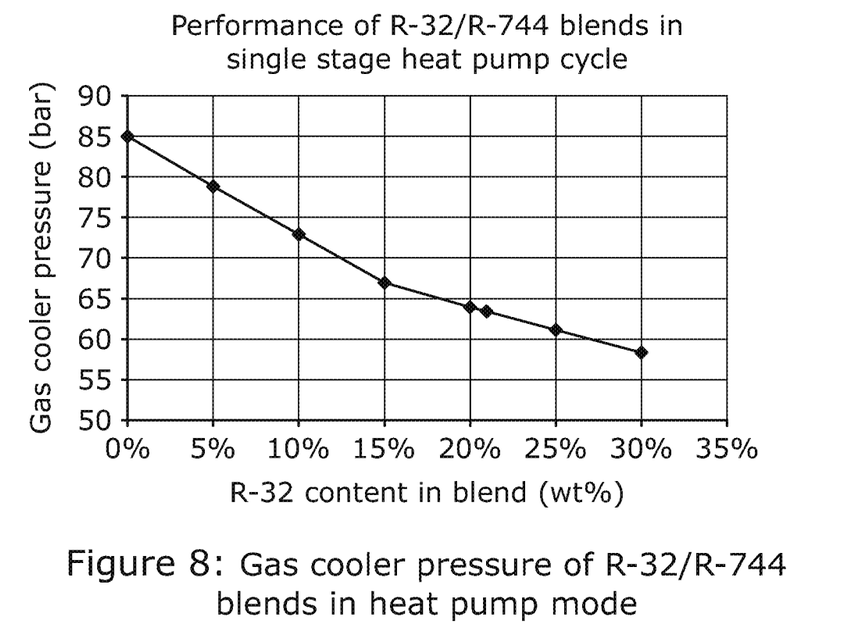
Figure 9:
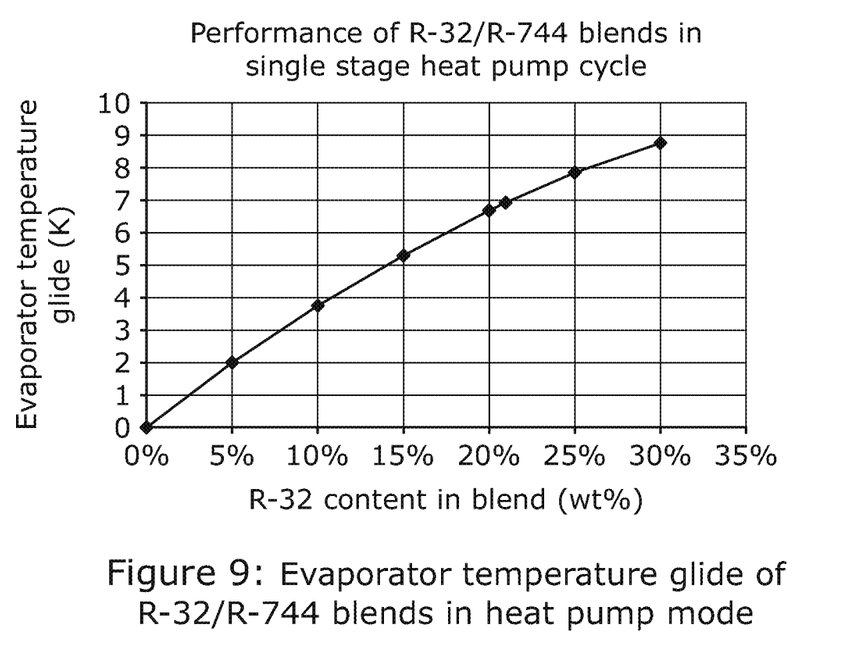

First a cycle using a single stage compressor was simulated under conditions that are representative of an automotive air conditioning application. A suction line/high pressure gas heat exchanger was included in the cycle as this is a standard technical feature of transcritical $CO_2$ systems. The cycle simulated is shown schematically in FIG. 1.

The following cycle parameters were used:

| Parameter | Units | Value |
|---|---|---|
| Ambient air temperature | ° C. | 33, 43, 58 |
| Minimum difference between refrigerant and air temperature in gas cooler | K | 4 |
| Mean (average) refrigerant evaporation temperature | ° C. | 7 |
| Evaporator superheat | K | 0 |
| Gas side temperature rise in suction line heat exchanger | K | 20 |
| Compressor isentropic efficiency | | 65% |

Table 1: Parameters Used for Modelling Single-Stage MAC Cycle

The model did not account for pressure drops in the system components.

It is seen that the following trends apply:
Coefficient of Performance increases as R-32 is added to $CO_2$. The extent of improvement is dependent on the ambient air temperature experienced by the gas cooler.
Optimum operating pressure of the gas cooler drops as R-32 is added, which is beneficial for the compressor.
Volumetric capacity drops slightly as R-32 is added, falling to about 85% of pure $CO_2$ for a blend having 21% R32.
Evaporator temperature glide increases as R-32 content increases. For compositions having a GWP of less than 150 (<22% R-32 by weight) the evaporator glide is less than 6° C., meaning that it should cause little adverse impact on evaporator performance It is evident that the addition of R-32 in quantities below 22% by weight can improve the energy efficiency of the cycle and significantly reduce operating pressures.

Example 2

The performance of R-32/$CO_2$ blends in an automotive heat pump cycle was next investigated by cycle modelling. Heat pump cycles are used in battery powered electric vehicles (pure electric and hybrid powertrains). The cycle model of the previous example was used, with altered parameters as shown in Table 3. These were chosen to be representative of conditions for an automotive application.

The following cycle parameters were used:

| Parameter | Units | Value |
| --- | --- | --- |
| Ambient air temperature | ° C | −15 exterior, 0 in the cabin; 40 C. target air temperature |
| Minimum difference between refrigerant and air inlet temperature in gas cooler | K | 25 |
| Mean (average) refrigerant evaporation temperature | ° C. | −25 |
| Evaporator superheat | K | 0 |
| Gas side temperature rise in suction line heat exchanger | K | 20 |
| Compressor isentropic efficiency | | 65% |

Table 3: Cycle Modelling Conditions for Automotive Heat Pump Mode

Selected results are shown in FIGS. 6 to 9. In this work the COP refers to the heating mode Coefficient of Performance.

It is seen that the same general trends of performance enhancement with addition of R-32 occur in heat pump mode and thus the use of R-32/$CO_2$ blends offer improved energy efficiency and reduced operating pressures over the use of pure $CO_2$. Improved energy efficiency is especially important for heat pumps installed electric vehicles since it reduces the energy consumed for passenger comfort and hence enhances the effective range of the battery.

Example 3

Figure 10:
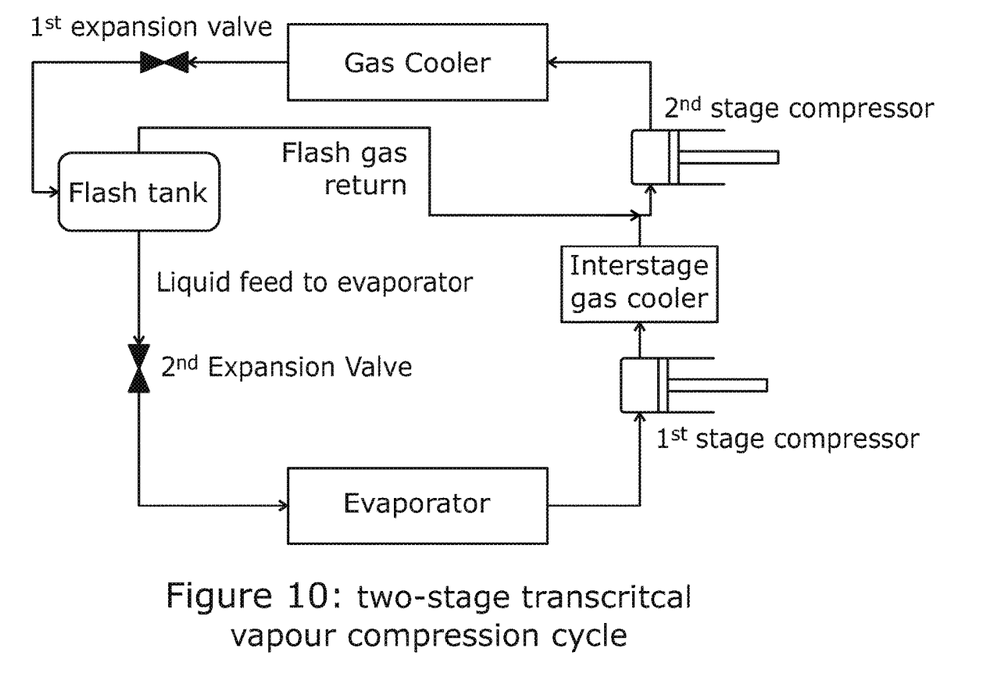
FIG. 10 illustrates an exemplary two-stage trans-critical cycle for modeling refrigerant compositions.
Figure 11:
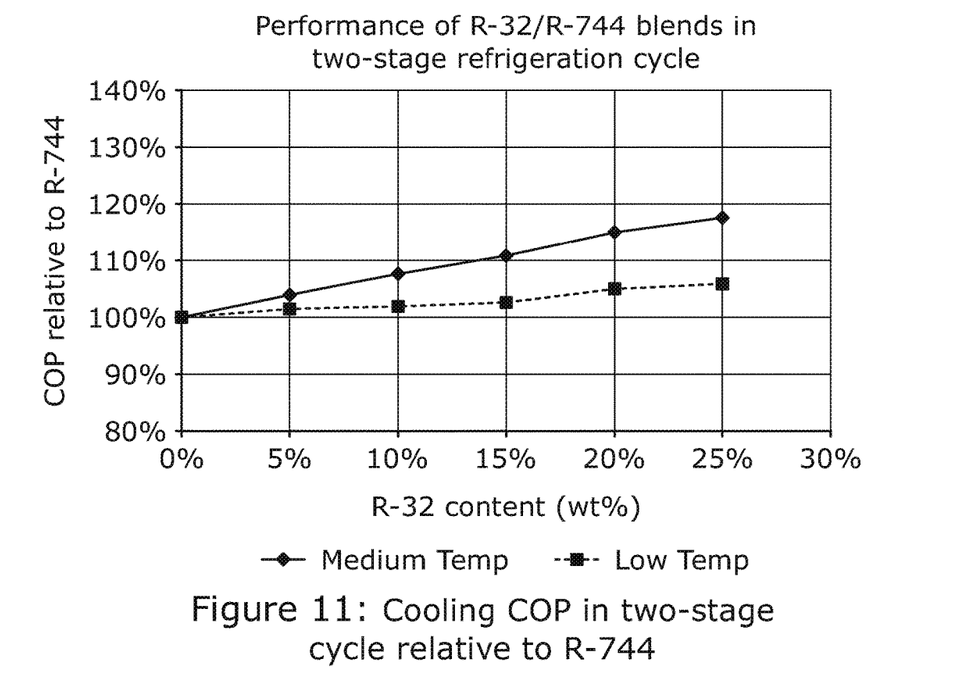
FIGS. 11-14 depict graphs illustrating the performance of R-32/R-744 blends in a two-stage A/C cycle.

A cycle model was constructed of a two-stage compression cycle, with intermediate cooling of the compressed gas leaving the first compression stage and with holdup of liquid refrigerant in a flash tank held at the inter-stage pressure. The cycle modelled is shown in FIG. 10.

Cycle simulations were carried out for $CO_2$ and selected R-32/$CO_2$ blends using this cycle with the input parameters as shown in Table 4.

TABLE 4

Cycle parameters for two-stage cycle

| Parameter | Value | Units |
| --- | --- | --- |
| Cooling duty | 6 | kW |
| Ambient air temperature | 35 | ° C. |
| Air-off temperature from gas coolers | 45 | ° C. |
| Approach in gas coolers | 4 | K |
| Mean refrigerant evaporation temperature | −5 (Medium temp) or −40 (Low temp) | ° C. |
| Approach in evaporator | 4 | K |
| Evaporator superheat | 5 | K |
| Suction line superheat | 15 | K |
| Minimum pressure differential (flash tank to evaporator) | 1 | bar |
| Suction pressure drop | 0.1 | bar |
| Evaporator pressure drop | 0.2 | bar |
| Gas cooler pressure drop | 0.5 | bar |
| Compressor isentropic efficiency | 70% | |

FIGS. 11 to 14 show selected results for two levels of refrigeration: Medium temperature (evaporator at −5° C.) and Low temperature (evaporator at −40° C.).

Figure 12:
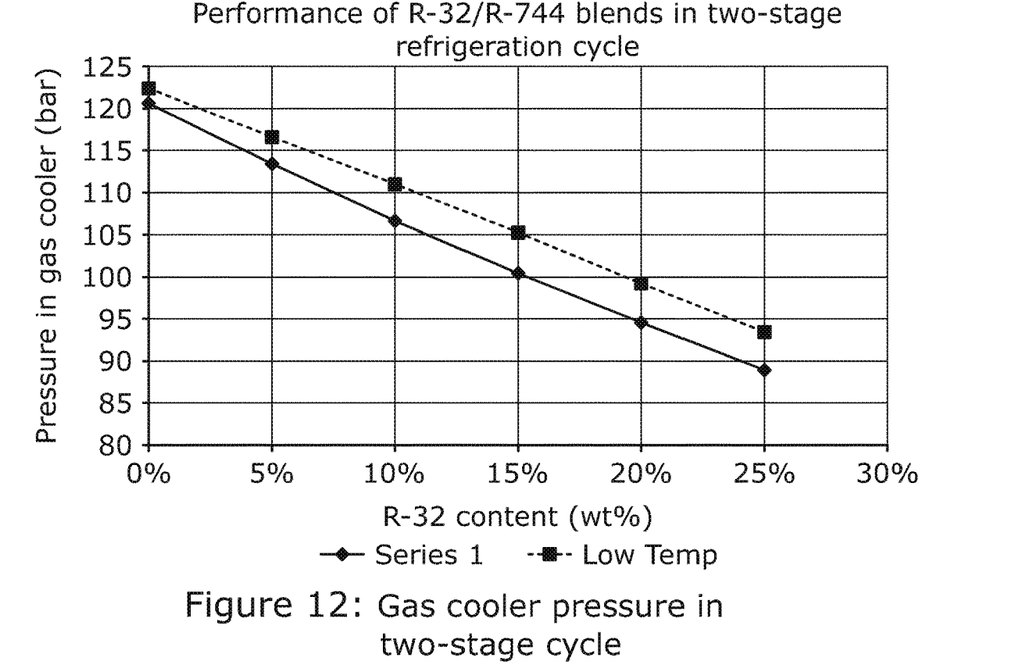
Figure 13:
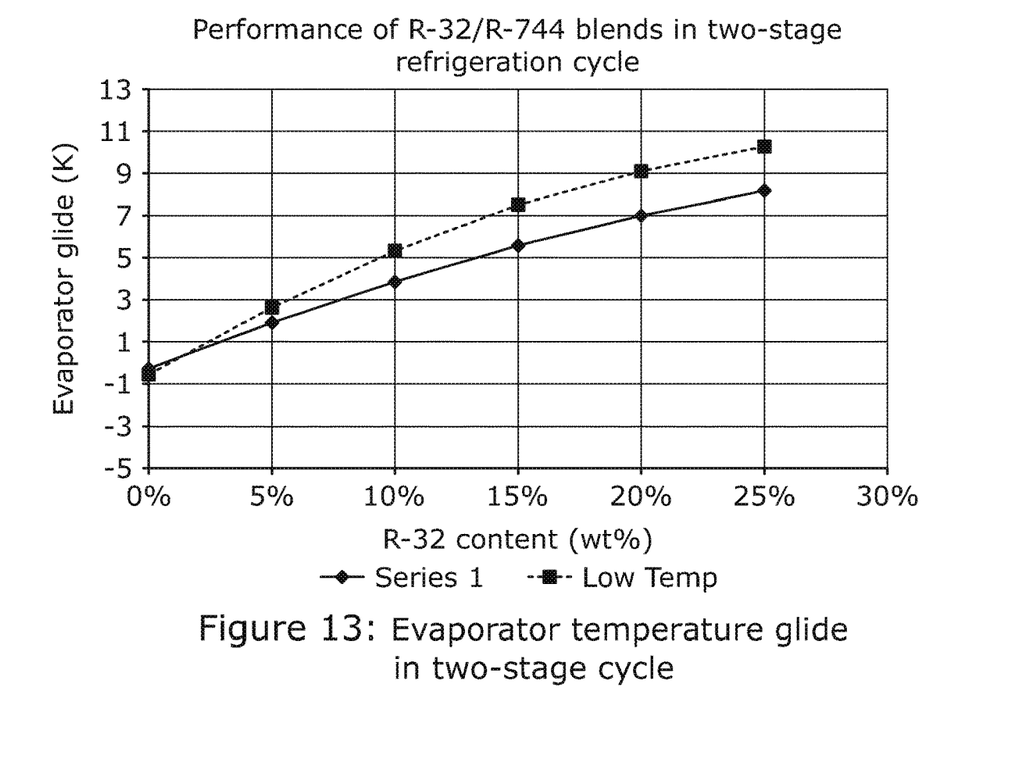
Figure 14:
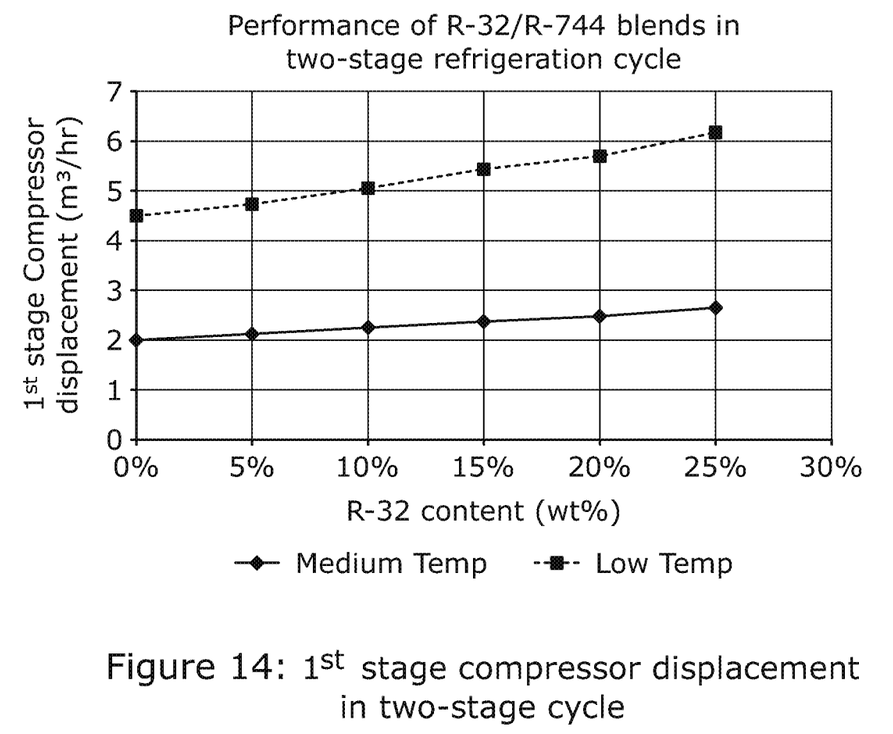

"Series 1" as used within FIGS. 12 to 14 refers to "medium temperature" conditions.

It is seen that similar trends in performance are seen in the two-stage cycle as with the earlier single-stage cycle modelling when R-32 is added to carbon dioxide ($CO_2$; R-744):

Increased energy efficiency
Reduced operating pressure
Temperature glide in evaporator remains below 10K if R-32 content is less than about 25% by weight
Volumetric cooling capacity is reduced as R-32 is added Example 4

REFLEAK4.0 was used to investigate the vapour leakage of a 21% R-32/79% $CO_2$ mixture at the worst-case conditions mandated by Standard 34, namely a vapour leak at −40° C. from a storage cylinder initially filled to 90% of the permitted maximum filling density. It was found that if more than about 77% of the charge leaked then the remaining liquid in the cylinder would contain more than 59% by weight R-32 and thus would be flammable.

This procedure was repeated for a 10% R-32/90% $CO_2$ mixture and it was found that this would also fractionate to a flammable liquid composition on removal of 90% of the charge as vapour at −40° C.

Figure 15:
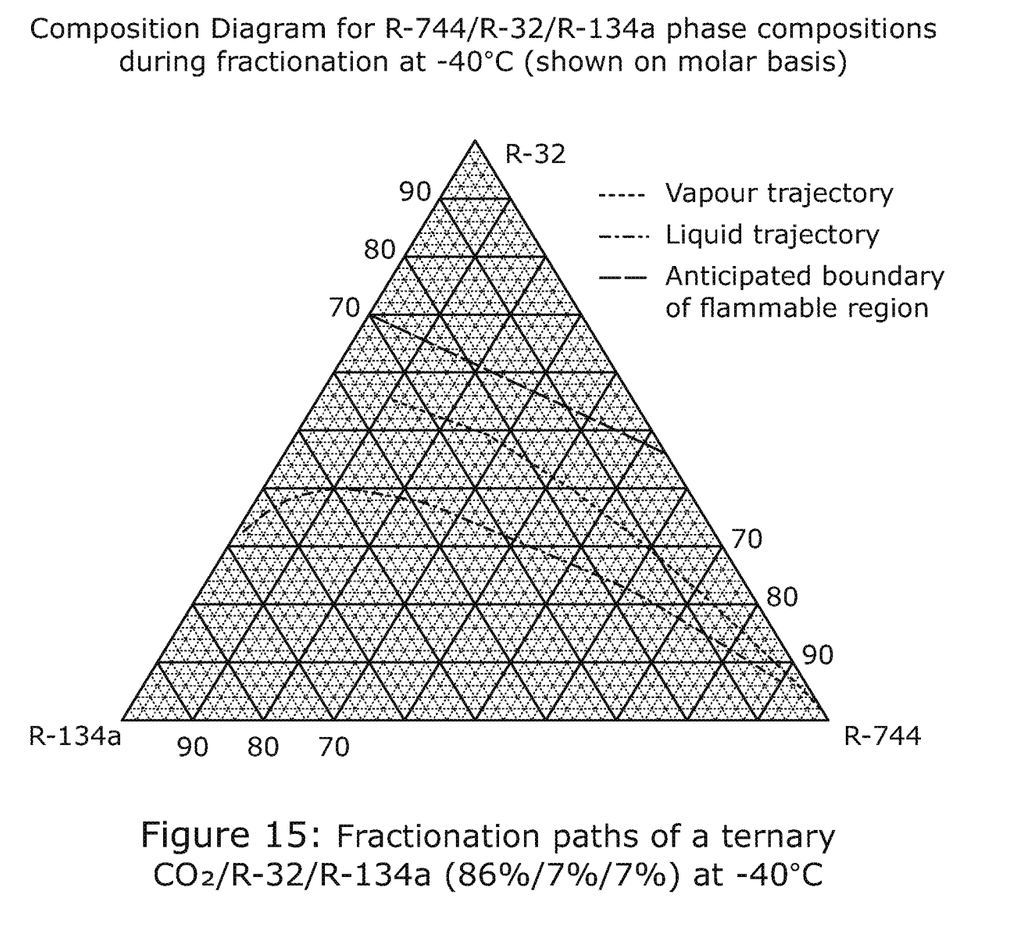
FIG. 15 illustrates an exemplary phase diagram for R-744/R-31/R-134a refrigerant compositions.

The fractionation of a mixture of 86% $CO_2$, 7% R-32 and 7% R-134a was investigated using NIST REFLEAK for the same cylinder leakage case as considered for the binary blend. This composition would have a GWP of 148. Binary interaction parameters for R-32 with $CO_2$ and R-134a with $CO_2$, derived by fitting experimental vapour-liquid equilibrium data, were input to the model for this simulation It was found that the addition of R-134a to the blend ensured that at all times in the leakage process the vapour and liquid compositions would be non-flammable. This is illustrated in FIG. 15, which represents the trajectory taken by liquid and vapour phases during the fractionation on a ternary composition diagram. The apex of the triangle represents pure R-32; the bottom left vertex is pure R-134a, and pure $CO_2$ is the bottom right vertex. In this diagram the compositions are shown on a molar basis as this allows easy depiction of the region of anticipated flammable ternary compositions (which is shaded).

The upper curved line starting from the $CO_2$ vertex shows the vapour phase composition during leakage and the lower curved line starting from the $CO_2$ vertex shows the liquid phase composition during leakage. The leak starts in the bottom right corner of the triangle near the $CO_2$ vertex.

It is evident that both phase compositions stay well away from the flammable region at all points in the leakage event. This mixture would therefore be classed as non-flammable under fractionation.

Example 5

The performance of a composition comprising 86% $CO_2$, 7% R-32 and 7% R-134a was then investigated using the air-conditioning cycle model previously described in Example 1. The results are shown in Table 5 below:

TABLE 5 comparison of performance of a ternary R-744/R-32/R-134a blend with R-744

| Parameter | Units | R-744 | R-744/ R-32/ R-134a 86/7/7% |
| --- | --- | --- | --- |
| COP | | 2.69 | 2.84 |
| Volumetric capacity | kJ/m³ | 14497 | 12794 |
| Compressor discharge temperature | ° C. | 102.6 | 107.3 |

TABLE 5-continued comparison of performance of a
ternary R-744/R-32/R-134a blend with R-744

| Parameter | Units | R-744 | R-744/R-32/R-134a 86/7/7% |
|---|---|---|---|
| Evaporator pressure | bar | 41.8 | 34.0 |
| Gas cooler pressure | bar | 90.2 | 75.3 |
| Evaporator glide | K | 0.0 | 6.4 |

Example 6

The performance of selected ternary compositions comprising $CO_2$, R-32 and R-1132a was then investigated using the following transcritical air-conditioning cycle model:

| INPUT CONDITIONS | |
|---|---|
| Gas cooler air inlet temperature | 33° C. |
| Gas cooler air exit temperature | 43° C. |
| Minimum temperature difference between refrigerant and gas in the gas cooler | 4 K |
| Cooling capacity | 4 kW |
| Mean evaporator temperature | 7° C. |
| Evaporator superheat | 0 K |
| Suction line temperature rise | 20 K |
| Compressor isentropic efficiency | 65% |

The results are shown in Tables 6 and 7 below.

TABLE 6 ternary compositions comprising $CO_2$/R-32/R-1132a

| | | | | | | | | | |
|---|---|---|---|---|---|---|---|---|---|
| | CO2 | 92% | 88% | 84% | 80% | 76% | 72% | 68% | 64% |
| | R1132a | 4% | 4% | 4% | 4% | 4% | 4% | 4% | 4% |
| | R32 | 4% | 8% | 12% | 16% | 20% | 24% | 28% | 32% |
| Coefficient of Performance (COP) | | 2.73 | 2.80 | 2.87 | 2.97 | 3.07 | 3.17 | 3.24 | 3.29 |
| Volumetric cooling capacity | kJ/m³ | 13948 | 13584 | 13213 | 12840 | 12500 | 12472 | 12323 | 12092 |
| Compressor discharge temperature | ° C. | 102.6 | 103.4 | 103.9 | 103.9 | 103.7 | 105.6 | 107.3 | 108.9 |
| Evaporator pressure | bar | 39.5 | 37.5 | 35.5 | 33.6 | 31.8 | 30.2 | 28.6 | 27.1 |
| Gas cooler pressure | bar | 85.6 | 81.4 | 77.2 | 72.9 | 68.7 | 66.2 | 63.7 | 61.3 |
| Evaporator temperature glide | K | 1.1 | 2.3 | 3.3 | 4.4 | 5.3 | 6.4 | 7.3 | 8.1 |

| RESULTS | | | | | | | | | |
|---|---|---|---|---|---|---|---|---|---|
| | CO2 | 88% | 84% | 80% | 76% | 72% | 68% | 64% | 60% |
| | R1132a | 8% | 8% | 8% | 8% | 8% | 8% | 8% | 8% |
| | R32 | 4% | 8% | 12% | 16% | 20% | 24% | 28% | 32% |
| Coefficient of Performance (COP) | | 2.71 | 2.77 | 2.85 | 2.94 | 3.04 | 3.15 | 3.23 | 3.28 |
| Volumetric cooling capacity | kJ/m³ | 13729 | 13375 | 13014 | 12648 | 12285 | 12214 | 12094 | 11878 |
| Compressor discharge temperature | ° C. | 101.8 | 102.6 | 103.1 | 103.2 | 102.8 | 104.1 | 105.8 | 107.3 |
| Evaporator pressure | bar | 39.2 | 37.2 | 35.3 | 33.4 | 31.6 | 30.0 | 28.4 | 26.9 |
| Gas cooler pressure | bar | 85.2 | 81.0 | 76.9 | 72.6 | 68.3 | 65.5 | 63.0 | 60.6 |
| Evaporator temperature glide | K | 1.1 | 2.2 | 3.3 | 4.3 | 5.3 | 6.2 | 7.1 | 7.9 |

TABLE 7 ternary compositions comprising $CO_2$/R-32/R-1132a

| | | | | | | | | | |
|---|---|---|---|---|---|---|---|---|---|
| | CO2 | 88% | 84% | 80% | 76% | 72% | 69% | 64% | 60% |
| | R1132a | 10% | 10% | 10% | 10% | 10% | 10% | 10% | 10% |
| | R32 | 2% | 6% | 10% | 14% | 18% | 21% | 26% | 30% |
| Coefficient of Performance (COP) | | 2.66 | 2.73 | 2.79 | 2.87 | 2.97 | 3.05 | 3.18 | 3.25 |
| Volumetric cooling capacity | kJ/m³ | 13789 | 13446 | 13077 | 12717 | 12359 | 12084 | 12028 | 11875 |
| Compressor discharge temperature | ° C. | 100.8 | 101.8 | 102.5 | 102.9 | 102.8 | 102.4 | 104.3 | 105.9 |
| Evaporator pressure | bar | 40.2 | 38.1 | 36.0 | 34.1 | 32.3 | 31.0 | 29.0 | 27.5 |
| Gas cooler pressure | bar | 87.0 | 82.9 | 78.8 | 74.6 | 70.3 | 67.1 | 63.8 | 61.4 |
| Evaporator temperature glide | K | 0.6 | 1.7 | 2.7 | 3.8 | 4.8 | 5.4 | 6.6 | 7.5 |

TABLE 7-continued ternary compositions comprising CO$_2$/R-32/R-1132a

RESULTS

| | | | | | | | | |
|---|---|---|---|---|---|---|---|---|
| CO2 | | 82% | 78% | 74% | 70% | 65% | 60% | 56% |
| R1132a | | 14% | 14% | 14% | 14% | 14% | 14% | 14% |
| R32 | | 4% | 8% | 12% | 16% | 21% | 26% | 30% |
| Coefficient of Performance (COP) | | 2.67 | 2.73 | 2.81 | 2.89 | 3.02 | 3.16 | 3.24 |
| Volumetric cooling capacity | kJ/m$^3$ | 13383 | 13045 | 12696 | 12347 | 11903 | 11784 | 11654 |
| Compressor discharge temperature | °C. | 100.6 | 101.4 | 101.9 | 102.1 | 101.6 | 102.9 | 104.4 |
| Evaporator pressure | bar | 38.8 | 36.8 | 34.8 | 33.0 | 30.8 | 28.7 | 27.2 |
| Gas cooler pressure | bar | 84.4 | 80.4 | 76.2 | 72.1 | 66.8 | 63.1 | 60.6 |
| Evaporator temperature glide | K | 1.1 | 2.2 | 3.2 | 4.2 | 5.4 | 6.5 | 7.3 |

As can be seen, although addition of R-1132a results in a small reduction of energy efficiency and cooling capacity, it ameliorates compressor discharge temperature and reduces the temperature glide in the evaporator.

Figure 16:
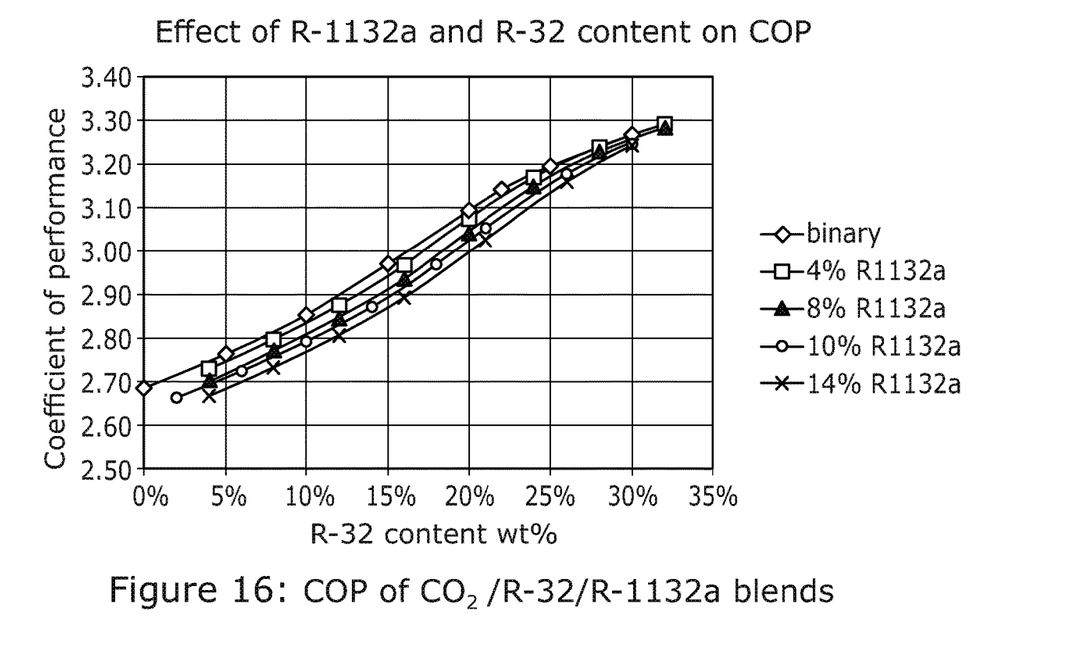
FIGS. 16-17 depict graphs illustrating the performance of R-744/R-31/R-1132a blends in a one-stage A/C cycle.
Figure 17:
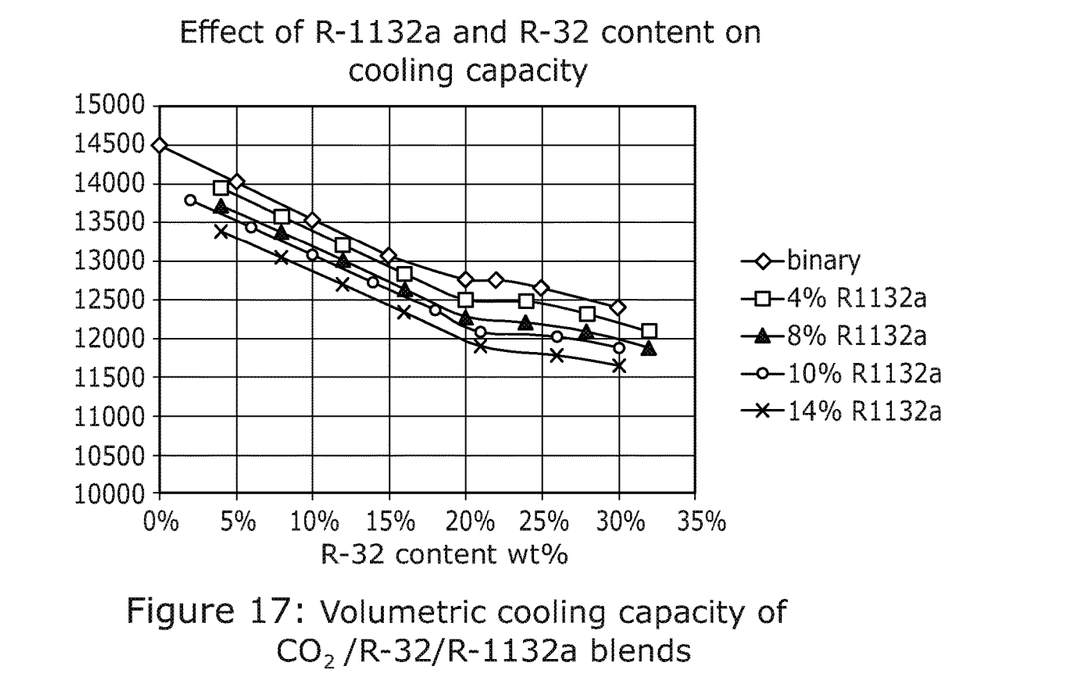

The effect of R-1132a and R-32 content on selected performance parameters is further illustrated in FIGS. 16 and 17.

FIG. 16 demonstrates the effect of R-1132a and R-32 content on the cooling coefficient of performance (COP).

FIG. 17 demonstrates the effect of R-1132a and R-32 content on the volumetric cooling capacity.

The term "binary" as used within FIGS. 16 and 17 refers to a binary composition of R-32 and CO$_2$ (no R-1132a present).

The invention claimed is:

1. A refrigerant composition comprising from 50 to 95 weight % carbon dioxide (CO$_2$, R-744), and from 1 to 32 weight % difluoromethane (R-32) and from 1 to 20 weight % of 1,1-difluoroethylene (R-1132a) based on the total weight of the refrigerant composition.

2. The refrigerant composition of claim 1, wherein difluoromethane is present in an amount of from 1 to 25 weight % based on the total weight of the refrigerant composition.

3. The refrigerant composition of claim 2, wherein the difluoromethane is present in an amount of from 20 to 25 weight % based on the total weight of the refrigerant composition.

4. The refrigerant composition of claim 2 which comprises less than 22 weight % difluoromethane (R-32) based on the total weight of the refrigerant composition.

5. The refrigerant composition of claim 2 which comprises less than 21 weight % difluoromethane (R-32) based on the total weight of the refrigerant composition.

6. The refrigerant composition of claim 2 which is a binary refrigerant composition comprising from 75 to 95 weight % carbon dioxide and from 25 to 1 weight % difluoromethane.

7. The refrigerant composition of claim 2 comprising from 75 to 80 weight % carbon dioxide and from 25 to 20 weight % difluoromethane.

8. The refrigerant composition of claim 2 further comprising 1,1,1,2-tetrafluoroethane (R-134a).

9. The refrigerant composition of claim 2 further comprising a tetrafluoropropene.

10. The refrigerant composition of claim 8 further comprising 2,3,3,3-tetrafluoropropene (R-1234yf) or 1,3,3,3-tetrafluoropropene (R-1234ze(E)), wherein the amounts of the 1,1,1,2-tetrafluoroethane and the selected tetrafluoropropene compound is such that the binary mixture of either R-1234yf or R-1234ze(E)e with R-134a is non-flammable.

11. The refrigerant composition of claim 1, composition comprising from 55 to 93 weight % of carbon dioxide, from 2 to 32 weight % difluoromethane and from 2 to 15 weight % of R-1132a based on the total weight of the refrigerant composition.

12. The refrigerant composition of claim 11 comprising from 64 to 93 weight % of carbon dioxide, from 2 to 25 weight % of difluoromethane and from 2 to 14 weight % of R-1132a based on the total weight of the refrigerant composition.

13. The refrigerant composition of claim 1 which is non-flammable.

14. The refrigerant composition of claim 1 which has a Global Warming Potential below 300, optionally below 150.

15. A transcritical heat transfer system for providing heating and/or cooling comprising a refrigerant composition as claimed claim 1.

16. A refrigeration, air-conditioning or heat pump system comprising a refrigerant composition as claimed in claim 1.

17. The transcritical heat transfer system of claim 15 which is an automotive air-conditioning system.

18. The transcritical heat transfer system of claim 15 which is an automotive heat pump system.

19. The transcritical heat transfer system of claim 15 which provides for both heating and air-conditioning in automotive applications.

20. The transcritical heat transfer system of claim 15 which is a heat pump system for the production of hot water.

21. The transcritical heat transfer system of claim 15 which is a supermarket refrigeration system.

22. The transcritical heat transfer system of claim 15 which is a residential air-conditioning system.

23. The transcritical heat transfer system of claim 15 which is a refrigerated transport system.

24. The transcritical heat transfer system of claim 15 which further comprises a lubricant.

25. The refrigeration, air-conditioning or heat pump system of claim 16 which further comprises a lubricant.

26. The transcritical heat transfer system of claim 15 further comprising a single stage compression cycle.

27. The transcritical heat transfer system of claim 15 further comprising a dual stage compression cycle.

28. An electric vehicle equipped with a transcritical air-conditioning and/or heat pump system as claimed in claim 16.

29. A method of producing cooling which comprises evaporating a refrigerant composition as claimed in claim 1 in the vicinity of a body to be cooled.

30. A method of producing heating which comprises condensing a refrigerant composition as claimed in claim 1 in the vicinity of a body to be heated.

31. The transcritical heat transfer system of claim 24 wherein the lubricant comprises a polyolester or polyalkylene glycol lubricant.

32. The refrigeration, air-conditioning or heat pump system of claim 25 wherein the lubricant comprises a polyolester or polyalkylene glycol lubricant.

* * * * *